April 2, 1963

J. E. GILLES 3,083,803

MECHANICAL POWER TRANSMISSIONS

Filed Aug. 1, 1961

INVENTOR
Juan Edmundo Gilles by Wenderoth, Lind & Ponack
ATTORNEYS

April 2, 1963  J. E. GILLES  3,083,803
MECHANICAL POWER TRANSMISSIONS
Filed Aug. 1, 1961  2 Sheets-Sheet 2
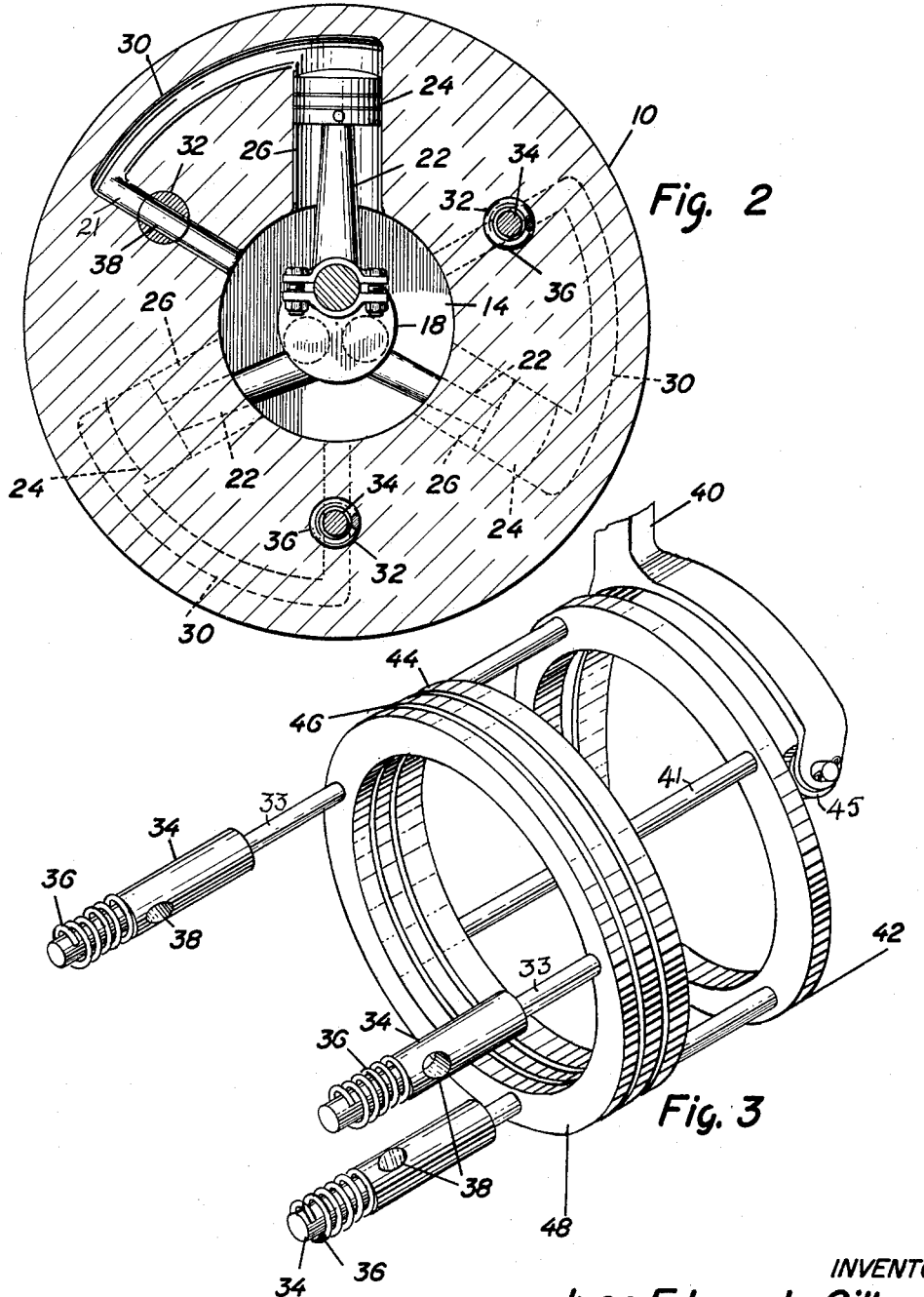
INVENTOR
Juan Edmundo Gilles
by Wenderoth, Lind & Ponack
ATTORNEYS United States Patent Office 3,083,803
Patented Apr. 2, 1963

3,083,803
MECHANICAL POWER TRANSMISSIONS
Juan Edmundo Gilles, Camino Maldonado 8496-Km. 16,
Montevideo, Uruguay
Filed Aug. 1, 1961, Ser. No. 128,406
3 Claims. (Cl. 192—60)

The present invention relates to a transmission system comprising at least three 120° angularly spaced and longitudinally dephased piston rods, a driving shaft, a crank shaft integral and coaxial with said driving shaft, said crank shaft providing connection for said three piston rods, a cylindrical block defining a central chamber, three 120° angularly spaced and longitudinally dephased cylinder bores connected to said central chamber, a piston slidably arranged in each cylinder bore, each piston being integral with one of said piston rods, said cylinder block being rotatably mounted on said driving shaft, a driven shaft integral with said cylinder block and coaxially arranged with said driving shaft, a casing surrounding said cylinder block and rotatably supporting said driving shaft and driven shaft, each of said cylinder bores having an outer blind end, three channels in said cylinder blocks, one connected to each of said blind ends and to said central chamber, three slide valves in said cylinder block one in controlling relationship with each of said channels, spring means in said casing urging said slide valves towards open position with regard to said channels, and position control means for said slide valves housed in said casing and controllable from outside.

An object of the invention is to provide for a smooth continuous variation in the transmission of energy or the consumption of various amounts of energy at a constant velocity of the driven shaft.

With the above and other objects in view which will become apparent from the detailed description below, a preferred embodiment of the invention is shown in the drawings in which:

FIGURE 2 is a cross-sectional view taken upon section line 2—2 of FIGURE 1 and

FIGURE 3 is a perspective view of the control or shifting arrangement for varying the transmission between the driving shaft and driven shaft.

In the various views the same reference characters indicate like parts.

Figure 1:
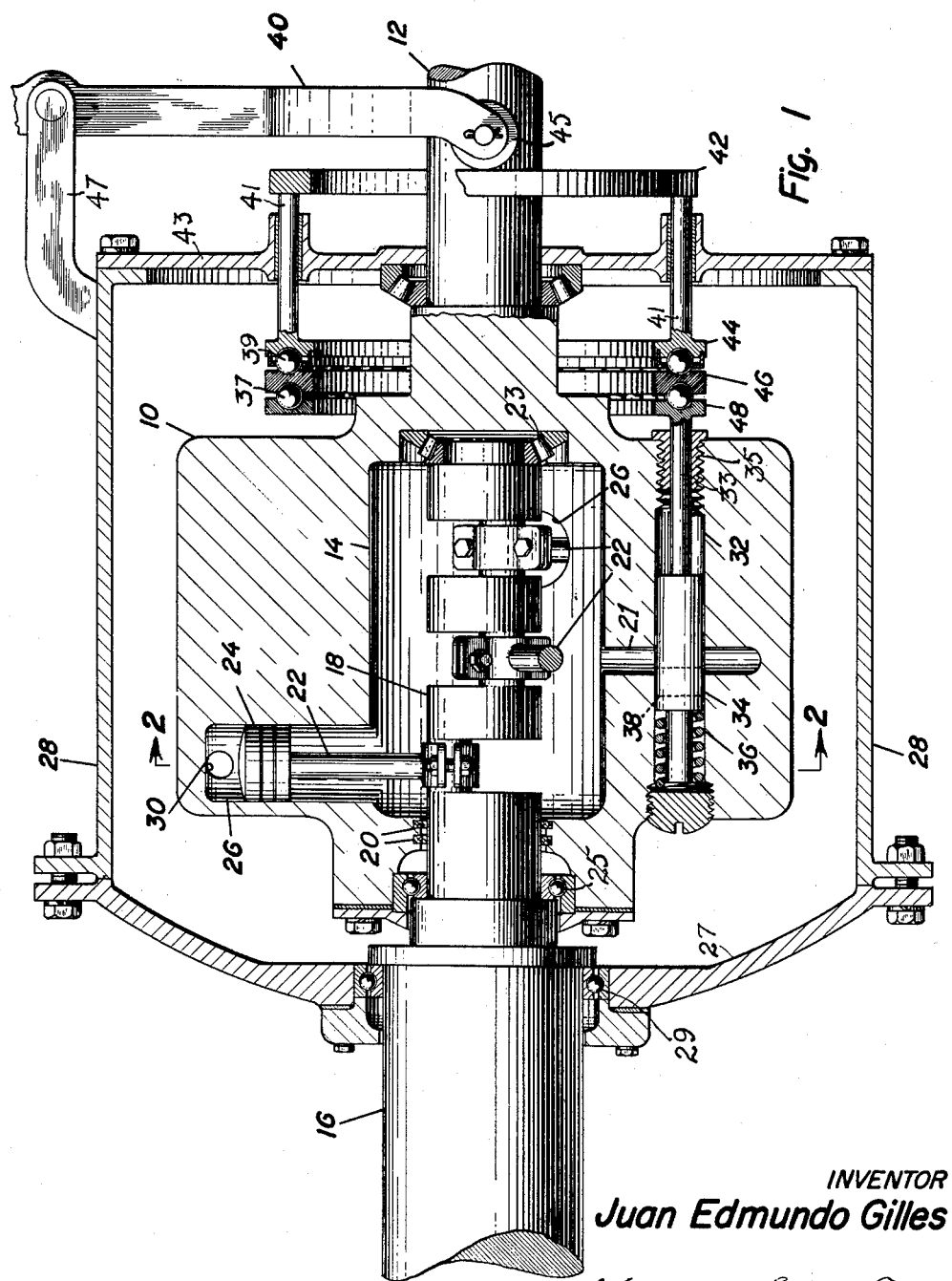
FIGURE 1 is a transverse sectional view with parts in elevation of such preferred modification.

Enclosed within the casing the casing 28 is a cylindrical block 10. Connected to the block 10 is the driven shaft 12 and mounted rotatably within the end cover 27 of the casing 28 by means of the bearings 29 is the drive shaft 16 which is connected to the crank shaft 18. The crank shaft 18 is mounted within the hollow cavity 14 of the cylindrical block 10 and is supported by the bearings 23. The shaft 16 is sealed from the interior 14 of the block 10 by the sealing means 20.

The crank shaft 18 is provided with a suitable number of piston rods 22 to which the pistons 24 are attached and which slide in a corresponding number of piston cylinders 26 provided within the block 10. In the improvement shown in the drawing there are three pistons shown and there are three cylinders 26 located 120° apart. The pistons will operate in the same manner as in a combustion engine or as a hydraulic pump.

As is obvious the pistons 24 will be displaced with respect to one another so that at no time do they occupy the same position in the corresponding cylinders 26 during reciprocation of the pistons. This is the situation when the shaft 16 is rotated without bringing about a rotation of the block 10. This means that at all times during such movements there is one piston which is moving away from and another which is moving towards the crank shaft 18 so that there is no possibility of creating any dead point in the system.

At the outer end of the cylinders 26 there is provided a channel 30 as shown more particularly in FIGURE 2 which connects the interior of the cylinder 26 between the piston 24 and its outer surface with the central chamber 14. The channel 30 extends circumferentially in the block 10 and then inwardly radially by the extensions 21 to the bore 14.

The bore 14 as well as the cylinders 26 and the channels 30 and 21 are filled with a fluid having a suitable viscosity and may be similar to the oil used in hydraulic systems for shock absorbers or the like. A rotation of the shaft 16 therefore will cause the pistons 24 to pump such fluid from the head of each cylinder to the bore or crank case 14 and vice versa while the block 10 remains stationary. In order to control the amount of power transmitted from the drive shaft 16 to the driven shaft 12 there are provided the bores 32 as shown more particularly in FIGURES 1 and 2 and these bores 32 intersect the extensions 21 upon the channels 30.

Located within each bore 32 is a stem 34 provided with a transverse bore 38. The bores 38 are designed to register with the extensions 21 as shown in FIGURE 2 when no transmission is to take place from the drive shaft 16 to the driven shaft 12.

A spring 36 normally urges the stem 34 so that the bore 38 registers with the extension 21. This will permit a free flow of the fluid in the interior of the block 10 but when these stems or slides 34 are displaced by a suitable means such as described below so that such registration is only a partial one there is a reduction in the volume of the liquid pumped through the channels 30 and 21 and its flow now meets with a resistance which will bring about a rotation of the block 10 and the driven shaft 12.

The rotation of driven shaft 16 relative to the block 10 is reduced and if the restriction accomplished by the slides 34 to the flow of fluid remains constant such reduced rotation is only possible when the block 10 assumes a rotation of its own which results in a rotation of the driven shaft 12. This rotation of the driven shaft 12 is equal to that which determines the hydraulic rate of flow which is compatible with the new situation which is set up in the system. When a resistance is introduced to the free flow of the fluid at the interior of the block 10 there is set up in accordance with the principle of action and reaction a rotary movement of the block 10 which will establish the necessary balance.

When the slides 34 are moved so as to completely shut off the flow of fluid through the channels 30 and 21 there is possible no rotation of the shaft 16 relative to the block 10. The movement of the pistons 24 in the cylinders 26 are completely blocked. There results therefore a complete annulment of all relative movement between the block 10 and the shaft 16 so that there is a complete transmission of all the mechanical energy from the shaft 16 to the shaft 12. In other words in such case the shafts 16 and 12 operate as though they were a continuous shaft.

The displacement of the stems or slides 34 may be controlled by any suitable method and one form thereof is shown in FIGURE 3. According to this method the slides 34 are secured to rods 33 which extend through pressure seals such as 35 mounted in the block 10. The rods 33 at their exterior ends are secured to a ring 48. The ring 48 is connected to a ring 46 and the ring 46 in turn is connected to the control ring 44. The ball bearing races 37 and 39 are interposed between the rings 48 and 46 and the rings 46 and 44 respectively. The ring 44 has secured thereto the rods 41 which extend through the plate 43 secured to the casing 28. The ends of the rods 41 outside of the plate 43 are secured to the thrust ring 42. Reacting with the thrust ring 42 is a pivoted forked member 40 having rollers 45 which contact the ring 42. The forked member 40 may be pivotally mounted from a bracket 47 upon the casing 28 or it may be pivotally mounted in any desired way and there may be associated therewith any desired type of means for maintaining the member 40 in the position to which it may be adjusted. The springs 36 upon release of the member 40 will return the slides 34 so that communication is again fully established through the channels 30 and 21.

The transmission above described may be used in a plurality of ways such as a variable speed reducing device, as a hydraulic gear shifting means for connecting the motor of an automobile to the driving wheels and in all cases where the smooth transmission of power is desired.

It is particularly suited for use in automobiles wherein there is a gradual continuous increase in the speed without any sudden change. In the construction described the engine is never disconnected or slowed down such as is necessary in known gear shifts. Also the transition from no power to full power being transmitted by the driving shaft to the driven shaft need not take place gradually but such shifts may be made more or less rapidly. Since there are no gears that can possibly be broken there is nothing to prevent rapid operation. Also the change in speed may be made in either an increasing or a reducing sense without any difficulty and also the engine itself may be used as a brake.

When the above arrangement is used in an automobile rear drive by means of reverse gears may be mounted on the driven shaft 12.

It is also apparent that the transition above described is extremely simple and comprises a considerably smaller number of parts than those used in the usual arrangements. Consequently the size thereof may be smaller and the weight and amount of material required for manufacture are less. The maintenance thereof is also considerably improved since there are no risks of breaking of the parts by an inexperienced operator.

The vehicle may be placed in gear although it may be standing parked since there are no problems of starting the engine by moving the vehicle, a difficult problem encountered nowadays with many vehicles having certain types of hydraulic gear shifts and no starting handle. This permits a very important solution particularly for racing cars since it permits a very rapid start and an acceleration to maximum speed practically instantaneously.

Furthermore the transmission may be used in trucks which hitherto have not permitted the use of such transmissions and may be used in all kinds of heavy vehicles such as tractors, amphibious vehicles as well as the very light vehicles such as motorcycles and the like.

The transmission may also be used as a speed reducing device and system for the gradual starting of electric motors of the most varied types.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A transmission system comprising at least three 120° angularly spaced and longitudinally dephased piston rods, a driving shaft, a crank shaft, integral and coaxial with said driving shaft, said crank shaft providing connection for said three piston rods, a cylindrical block defining a central chamber, three 120° angularly spaced and longitudinally dephased cylinder bores connected to said central chamber, a piston slidably arranged in each cylinder bore, each piston being integral with one of said piston rods, said cylinder block being rotatably mounted on said driving shaft, a driven shaft integral with said cylinder block and coaxially arranged with said driving shaft, a casing surrounding said cylinder block and rotatably supporting said driving shaft and driven shaft, each of said cylinder bores having an outer blind end, three channels in said cylinder blocks, one connected to each of said blind ends and to said central chamber, three slide valves in said cylinder block one in controlling relationship with each of said channels, spring means in said casing urging said slide valves towards open position with regard to said channels, and position control means for said slide valves housed in said casing and controllable from outside.

2. A transmission system comprising at least three 120° angularly spaced and longitudinally dephased piston rods, a driving shaft, a crank shaft integral and coaxial with said driving shaft, said crank shaft providing connection for said three piston rods, a cylindrical block defining a central chamber, three 120° angularly spaced and longitudinally dephased cylinder bores connected to said central chamber, a piston slidably arranged in each cylinder bore, each piston being integral with one of said piston rods, said cylinder block being rotatably mounted on said driving shaft, a driven shaft integral with said cylinder block and coaxially arranged with said driving shaft, a casing surrounding said cylinder block and rotatably supporting said driving shaft and driven shaft, each of said cylinder bores having an outer blind end, three channels in said cylinder blocks, one connected to each of said blind ends and to said central chamber, said cylindrical block further defining three bores, one bore intersecting one of said channels, a stem slidably arranged in each bore and provided with a transverse bore of substantially the same cross-section as said channel, spring means mounted on said stem within said bore capable of urging the stem portion including said transverse bore into register with said channel, said stem projecting out of said cylindrical block, a first ring, a second ring and a third ring concentrically arranged about said driven shaft, said first and second rings and said second and third rings defining ball bearing races, balls within said races and said first, second and third rings being linked together, said stems being connected to said first ring opposite its ball bearing race, a plurality of rods connected to said third ring opposite its ball bearing race, said last mentioned rods projecting out of said casing, a fourth ring connected to said last mentioned rods outside said casing and position control means connected to said fourth ring for determining the position of said fourth ring with regard to said casing.

3. A transmission system comprising at least three 120° angularly spaced and longitudinally dephased piston rods, a driving shaft, a crank shaft integral and coaxial with said driving shaft, said crankshaft providing connection for said three piston rods, a cylindrical block defining a central chamber, three 120° angularly spaced and longitudinally dephased cylinder bores connected to said central chamber, a piston slidably arranged in each cylinder bore, each piston being integral with one of said piston rods, said cylinder block being rotatably mounted on said driving shaft, a driven shaft integral with said cylinder block and coaxially arranged with said driving shaft, a casing surrounding said cylinder block and rotatably supporting said driving shaft and driven shaft, each of said cylinder bores having an outer blind end, three channels in said cylinder blocks, one connected to each of said blind ends and to said central chamber, said cylindrical block further defining three bores, one bore intersecting one of said channels, a stem slidably arranged in each bore and provided with a transverse bore of substantially the same cross-section as said channel, spring means mounted on said stem within said bore capable of urging the stem portion including said transverse bore into register with said channel, said stem projecting out of said cylindrical block, a first ring, a second ring and a third ring concentrically arranged about said driven shaft, said first and second rings and said second and third rings defining ball bearing races, balls within said races and said first, second and third rings being linked together, said stems being connected to said first ring opposite its ball bearing race, a plurality of rods connected to said third ring opposite its ball bearing race, said last mentioned rods projecting out of said casing, a fourth ring connected to said last mentioned rods outside said casing, a fork member pivotally supported by said casing, said fork member having a pair of free ends, rollers on said free ends in pushing contact with said fourth ring in a direction opposite to the urging direction of said spring means.

References Cited in the file of this patent

UNITED STATES PATENTS

| | | |
|---|---|---|
| 809,331 | De Simone | Jan. 9, 1906 |
| 902,761 | Prather | Nov. 3, 1908 |
| 1,278,960 | McDonald | Sept. 17, 1918 |
| 1,458,565 | Weston | June 12, 1923 |
| 1,466,622 | Hele-Shaw | Aug. 28, 1923 |
| 1,474,007 | Sides et al. | Nov. 13, 1923 |
| 2,140,886 | Staats | Dec. 20, 1938 |